(12) United States Patent
Wakeman

(10) Patent No.: US 9,162,548 B1
(45) Date of Patent: Oct. 20, 2015

(54) VEHICLE AND A SUSPENSION ASSEMBLY FOR A VEHICLE

(71) Applicant: GM GLOBAL TECHNOLOGY OPERATIONS LLC, Detroit, MI (US)

(72) Inventor: Mark Wakeman, Vermont (AU)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/331,707

(22) Filed: Jul. 15, 2014

(51) Int. Cl.
*B60G 17/033* (2006.01)
*B60G 15/06* (2006.01)

(52) U.S. Cl.
CPC ............ *B60G 17/033* (2013.01); *B60G 15/065* (2013.01)

(58) Field of Classification Search
CPC ............................ B60G 17/033; B60G 15/065
USPC ................... 280/124.101, 124.145, 124.179; 267/195, 212, 218, 221
See application file for complete search history.

(56) References Cited

U.S. PATENT DOCUMENTS

| | | | | |
|---|---|---|---|---|
| 2,902,274 | A * | 9/1959 | McIntyre | 267/225 |
| 4,521,002 | A * | 6/1985 | Adorjan et al. | 267/221 |
| 6,676,144 | B2 * | 1/2004 | Wagner et al. | 280/124.135 |
| 8,317,003 | B2 * | 11/2012 | Michel | 188/321.11 |
| 8,371,588 | B2 * | 2/2013 | Kohlhauser et al. | 280/5.514 |
| 2005/0189685 | A1 * | 9/2005 | Verriet | 267/34 |
| 2006/0163787 | A1 * | 7/2006 | Munster et al. | 267/221 |
| 2009/0057969 | A1 * | 3/2009 | Michel | 267/218 |
| 2009/0302559 | A1 * | 12/2009 | Doerfel | 280/5.519 |
| 2010/0308518 | A1 * | 12/2010 | Michel | 267/218 |
| 2012/0242057 | A1 | 9/2012 | Glover et al. | |
| 2014/0197586 | A1 * | 7/2014 | Wolf-Monheim | 267/218 |

OTHER PUBLICATIONS

Article entitled "Airbag Suspension Systems—Part One" from the autospeed website: http://www.autospeed.com/cms/article.html?&title=Airbag-Suspension-Systems-Part-One&A=3034; issue 397, section: special features; dated: Sep. 9, 2006; 5 pages.
Article entitled "2012 Lamborghini Aventador: Suspension Walkaround" from the website: http://www.edmunds.com/car-reviews/track-tests/2012-lamborghini-aventador-suspension-walkaround.html; published: Aug. 21, 2012; 22 pages.
Webpage from the Integra Engineering website: http://www.integrashocksandsprings.com/general/2011/2StageStackSprings.php; retrieval date: Oct. 10, 2013; 2 pages.
"McLaren P1 with hydraulically interconnected dampers" from the website: http://adsves.weebly.com/2/post/2013/08/raceactive-chassis-control-rcc.html; dated: Aug. 21, 2013; 2 pages.

* cited by examiner

*Primary Examiner* — Ruth Ilan
*Assistant Examiner* — Darlene P Condra
(74) *Attorney, Agent, or Firm* — Quinn Law Group, PLLC

(57) ABSTRACT

A vehicle and a suspension assembly for a vehicle are disclosed. A shock absorber includes a distal end and a proximal end spaced from each other along a central axis. A first spring and a second spring each encircle the shock absorber. The first and second springs align with each other along the central axis between the distal and proximal ends. An actuator includes a movable portion which is movable relative to the shock absorber between a first position wherein the first spring and the second spring are both compressible to define a first total spring rate, and a second position wherein the first spring is incompressible and the second spring is compressible to define a second total spring rate different from the first total spring rate.

19 Claims, 2 Drawing Sheets

VEHICLE AND A SUSPENSION ASSEMBLY FOR A VEHICLE

TECHNICAL FIELD

The present disclosure relates to a vehicle and a suspension assembly for the vehicle.

BACKGROUND

Vehicles have been developed having a suspension system. Roads can have bumps or holes and when a vehicle travels over a bump or hole, the suspension system can dampen movement of a sprung mass of the vehicle which provides a smoother ride. Some suspension systems can adjust damping or ride height of the vehicle.

SUMMARY

The present disclosure provides a suspension assembly for a vehicle. The suspension assembly includes a shock absorber. The shock absorber includes a distal end and a proximal end spaced from each other along a central axis. The suspension assembly further includes a first spring encircling the shock absorber and a second spring encircling the shock absorber. The first spring and the second spring align with each other along the central axis between the distal end and the proximal end. The suspension assembly further includes an actuator including a movable portion which is movable relative to the shock absorber between a first position wherein the first spring and the second spring are both compressible to define a first total spring rate, and a second position wherein the first spring is incompressible and the second spring is compressible to define a second total spring rate different from the first total spring rate.

The present disclosure also provides a vehicle including a structure and a suspension assembly coupled to the structure to dampen movement of the structure. The suspension assembly includes the features discussed immediately above.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that terms such as "above", "below", "upward", "up", "downward", "down", "top", "bottom", "left", "right", "back", "forth", etc., are used descriptively for the figures, and do not represent limitations on the scope of the disclosure, as defined by the appended claims. Furthermore, the term "substantially" can refer to a slight imprecision or slight variance of a condition, quantity, value, or dimension, etc., some of which are within manufacturing variance or tolerance ranges that can be subject to human error during installation, etc.

Figure 1:
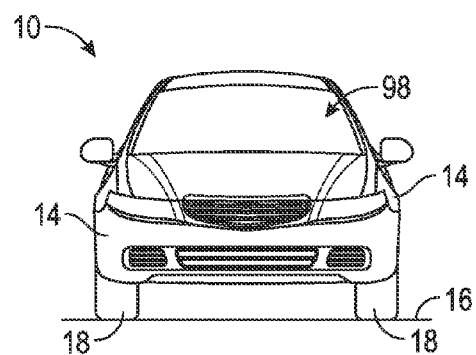
FIG. 1 is a schematic front view of a vehicle.
Figure 2:
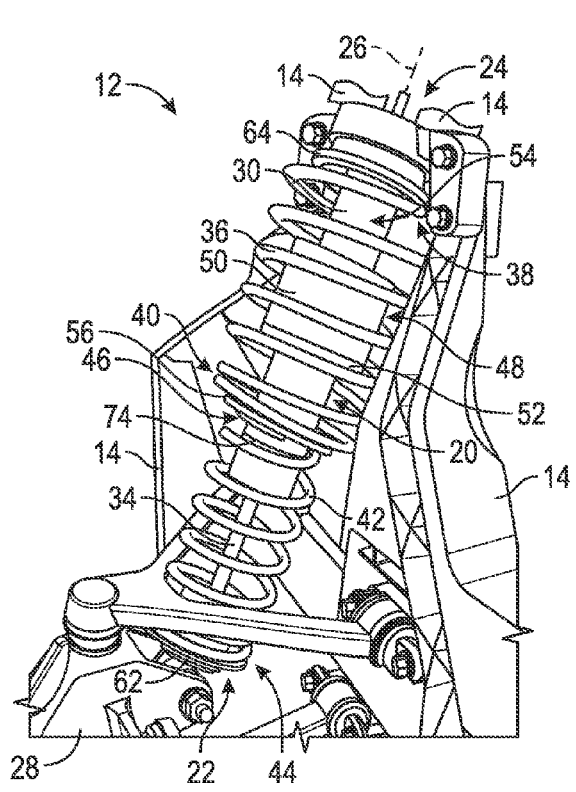
FIG. 2 is a schematic fragmentary perspective view of a suspension assembly.

Referring to the Figures, wherein like numerals indicate like or corresponding parts throughout the several views, a vehicle 10 is generally shown in FIG. 1 and a suspension assembly 12 for the vehicle 10 is best shown in FIG. 2.

The vehicle 10 can be an automotive vehicle, such as a car, a sports car, a truck, etc. Furthermore, the vehicle 10 can be a hybrid vehicle utilizing an internal combustion engine and one or more motor-generators. Additionally, the vehicle 10 can be an electric vehicle utilizing one or more motor-generators and eliminating the internal combustion engine. As another example, the vehicle 10 can be a vehicle utilizing the internal combustion engine and eliminating the motor-generator(s). It is to be appreciated that the vehicle 10 can alternatively be a non-automotive vehicle.

Referring to FIGS. 1 and 2, the vehicle 10 can include a structure 14. The suspension assembly 12 is coupled to the structure 14 to dampen movement of the structure 14. The suspension assembly 12 supports the structure 14 and the structure 14 is spaced from a road 16 or ground. The structure 14 can be one or more of: a chassis, a support structure, a frame, a subframe, a body, a brace, a panel, an outer skin, etc. The structure 14 can be any suitable configuration. Additionally, the structure 14 can be any component of a sprung mass of the vehicle 10, including the body, the frame, the subframe, the chassis, the outer skin, or any load-bearing component which is supported by the suspension assembly 12.

The suspension assembly 12 allows a user to select a spring rate based on desired driving conditions to, for example, soften the suspension or stiffen the suspension. The suspension assembly 12 can be utilized for a front suspension system and/or for a rear suspension system. A plurality of suspension assemblies 12 can be utilized, with one suspension assembly 12 coupled to one of the wheels 18, another suspension assembly 12 coupled to another one of the wheels 18, etc. As one example, when all of the wheels 18 of a four wheeled vehicle 10 utilize a suspension assembly 12, the front suspension system has two suspension assemblies 12 and the rear suspension system has two suspension assemblies 12. One suspension assembly 12 is discussed in detail below.

Figure 3:
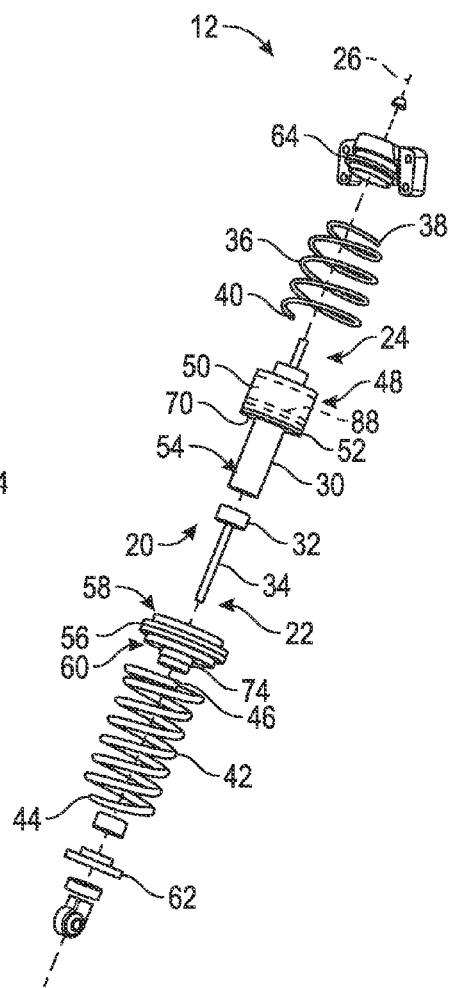
FIG. 3 is a schematic exploded perspective view of the suspension assembly.

Turning to FIGS. 2 and 3, the suspension assembly 12 includes a shock absorber 20. The shock absorber 20 can dampen movement of the structure 14, and more specifically, dampen movement of the sprung mass. The shock absorber 20 includes a distal end 22 and a proximal end 24 spaced from each other along a central axis 26. The distal end 22 of the shock absorber 20 can be coupled to a wheel carrier 28 which supports one wheel 18, and the proximal end 24 of the shock absorber 20 can be coupled to the structure 14. Optionally, the shock absorber 20 can be adjustable to change the amount of dampening of the structure 14 as desired.

Continuing with FIGS. 2 and 3, the shock absorber 20 can include a cylinder 30 and a piston 32 movably disposed in the cylinder 30 along the central axis 26. The cylinder 30 remains stationary and the piston 32 can move relative to the cylinder 30 when, for example, the vehicle 10 moves over bumps in the road 16. The cylinder 30 and the piston 32 cooperate to dampen movement of the structure 14. The cylinder 30 can be partially filled with a fluid, such as a liquid fluid or a gaseous fluid, or any other suitable material(s), such as magnetorheological fluid, etc. Magnetorheological fluid can include oil having iron particles. When the cylinder 30 contains magnetorheological fluid, the cylinder 30 can also contain other components, not specifically described herein, which can energize the fluid.

Continuing with FIGS. 2 and 3, the shock absorber 20 can also include a rod 34 extending from the piston 32 and partially disposed outside of the cylinder 30. Specifically, the distal end 22 of the shock absorber 20 can be further defined on the rod 34 and the proximal end 24 of the shock absorber 20 can be further defined on the cylinder 30. Therefore, the distal end 22 of the rod 34 can be coupled to the wheel carrier 28 and the proximal end 24 of the cylinder 30 can be coupled to the structure 14.

Referring to FIG. 2, the suspension assembly 12 also includes a first spring 36 encircling the shock absorber 20. Said differently, the first spring 36 surrounds the shock absorber 20. The first spring 36 can include a first end 38 and a second end 40 spaced from each other along the central axis 26. In certain embodiments, the first end 38 of the first spring 36 is disposed proximal to or near the proximal end 24 of the shock absorber 20. In certain embodiments, the first spring 36 can be a coil spring.

Continuing with FIG. 2, the suspension assembly 12 further includes a second spring 42 encircling the shock absorber 20. Said differently, the second spring 42 surrounds the shock absorber 20. The first spring 36 and the second spring 42 align with each other along the central axis 26 between the distal end 22 and the proximal end 24. The second spring 42 can include a first end 44 and a second end 46 spaced from each other along the central axis 26. In certain embodiments, the first end 44 of the second spring 42 is disposed proximal to or near the distal end 22 of the shock absorber 20. The second end 40 of the first spring 36 and the second end 46 of the second spring 42 are disposed proximal to or near each other, with the second ends 40, 46 spaced from each other. Said differently, the first spring 36 and the second spring 42 are in-line with each other along the central axis 26 between the distal end 22 and the proximal end 24 of the shock absorber 20. In other words, the first spring 36 and the second spring 42 are in a series configuration. In certain embodiments, the second spring 42 can be a coil spring.

Turning to FIGS. 2-5, the suspension assembly 12 includes an actuator 48. In certain embodiments, the actuator 48 is disposed between the shock absorber 20 and at least one of the first spring 36 and the second spring 42 transverse to the central axis 26. In other words, the actuator 48 is disposed radially between the shock absorber 20 and at least one of the first spring 36 and the second spring 42 relative to the central axis 26. In certain embodiments, the first spring 36 encircles or surrounds the actuator 48. Therefore, in certain embodiments, the actuator 48 is disposed radially between the shock absorber 20 and the first spring 36 relative to the central axis 26. In other embodiments, the second spring 42 encircles or surrounds the actuator 48.

The actuator 48 includes a movable portion 52 which is movable relative to the shock absorber 20 between a first position wherein the first spring 36 and the second spring 42 are both compressible to define a first total spring rate, and a second position wherein the first spring 36 is incompressible and the second spring 42 is compressible to define a second total spring rate different from the first total spring rate. In certain embodiments, the movable portion 52 of the actuator 48 is movable along the central axis 26 between the first and second positions.

When the movable portion 52 is in the first position, both the first spring 36 and the second spring 42 are active together or operable. When the movable portion 52 is in the second position, the second spring 42 is active or operable and the first spring 36 is inactive or not operable. The actuator 48 allows the suspension system to change between different total spring rates. For example, the actuator 48 allows the suspension assembly 12 to change between different total spring rates while minimizing changes in the height of the vehicle 10 relative to the road 16. Said differently, the suspension assembly 12 can change between spring rates without substantially changing the ground clearance between the road 16 and the vehicle 10. Therefore, the actuator 48 is switchable between different total spring rates which allow the user to choose the desired performance of the suspension assembly 12 based on driving conditions.

Figures 4, 5:
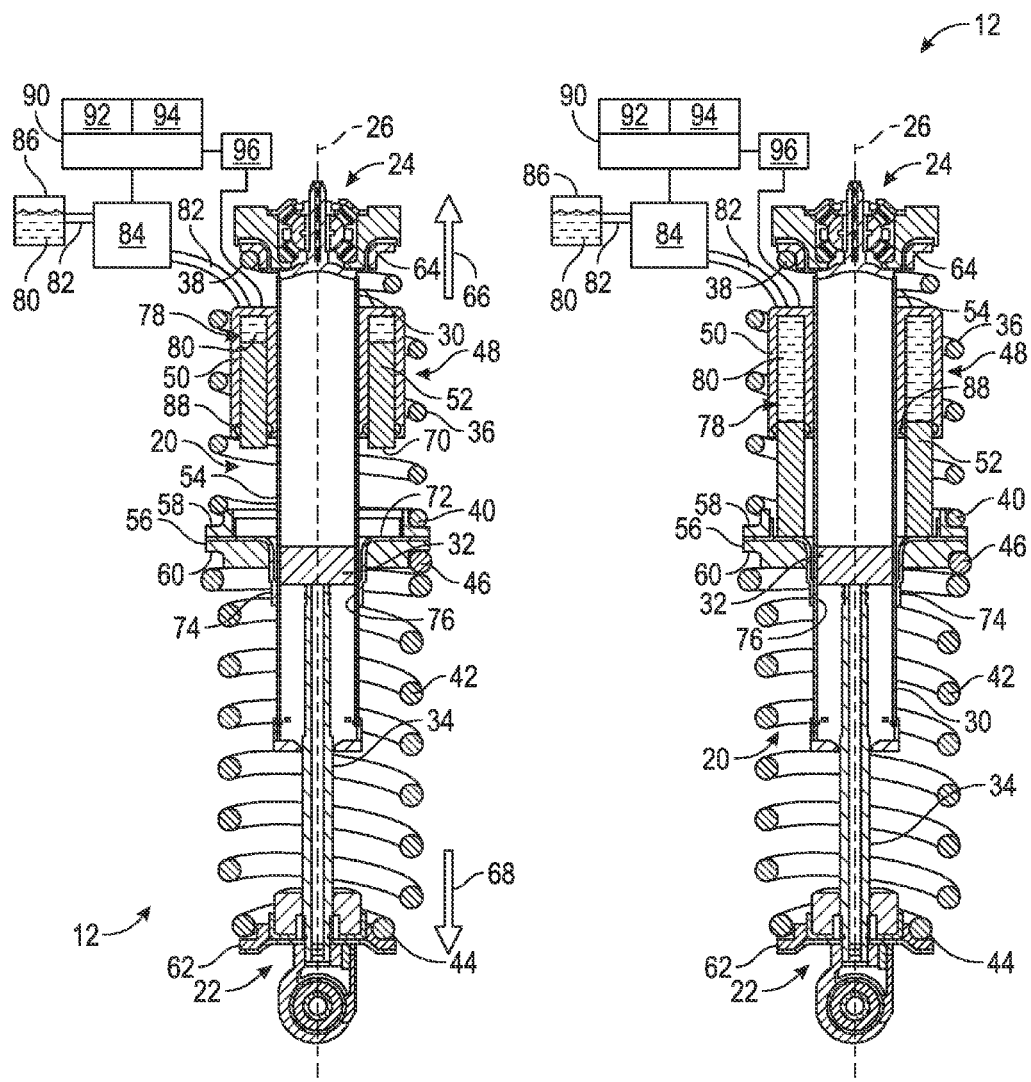
FIG. 4 is a schematic cross-sectional view of the suspension assembly, with a movable portion of an actuator in a first position.
FIG. 5 is a schematic cross-sectional view of the suspension assembly, with the movable portion of the actuator in a second position.

The first position is shown in FIGS. 2 and 4, and the second position is shown in FIG. 5. When the movable portion 52 of the actuator 48 is in the first position, the vehicle ride is softer than when in the second position. When the movable portion 52 of the actuator 48 is in the second position, the vehicle ride is stiffer than when in the first position. Therefore, for example, the first position can be utilized when the vehicle 10 is traveling on surface roads when a soft ride is desired and the second position can be utilized when the vehicle 10 is traveling on a track when a stiffer ride is desired. Simply stated, the first position and the second position can be selected depending on the desired performance of the suspension assembly 12. The second position, with the stiffer suspension, can further compensate or offset for aerodynamic forces as compared to the first position. Additionally, the second position, with the stiffer suspension, can further compensate or offset a load created by the weight of cargo, etc. in the vehicle 10 as compared to the first position.

The first spring 36 has a first spring rate and the second spring 42 has a second spring rate. The second total spring rate is equal to the second spring rate. As mentioned above, the first spring 36 and the second spring 42 are in a series configuration, therefore, when both of the springs 36, 42 are compressible, an inverse of the first total spring rate is the sum of an inverse of the first spring rate and an inverse of the second spring rate. Summing of the inverse of the first spring rate and the inverse of the second spring rate together delivers an overall lower spring rate than the second spring 42. Therefore, the second total spring rate is higher than the first total spring rate. Said differently, since the inverse of the first total spring rate is the sum of the inverse of the first spring rate and the inverse of the second spring rate, the second total spring rate is higher than the first total spring rate because the second total spring rate is one spring rate (not the inverse sum of the two spring rates).

In one embodiment, the first spring rate is less than the second spring rate. It is to be appreciated that the first spring 36 can be any suitable size to provide the desired first spring rate (greater than, equal to or less than the second spring rate) and the second spring 42 can be any suitable size to provide the desired second spring rate (greater than, equal to or less than the first spring rate). The higher spring rate provides a stiffer suspension, and thus the lower spring rate provides a softer suspension.

Referring to FIGS. 4 and 5, the actuator 48 can include a stationary portion 50 affixed to the shock absorber 20, and the movable portion 52 is coupled to the stationary portion 50. The movable portion 52 is movable relative to the stationary portion 50. Specifically, the movable portion 52 is movable along the central axis 26 relative to the cylinder 30. The stationary portion 50 can be affixed to the cylinder 30, and specifically, affixed to an outer surface 54 of the cylinder 30. The stationary portion 50 can be affixed or attached by any suitable methods, such as welding, adhesive, integrally formed such that the stationary portion 50 and the cylinder 30 are one piece or a unit, etc. It is to be appreciated that the actuator 48, and thus the stationary and movable portions 50, 52, can be in any suitable location.

Referring to FIGS. 3-5, the suspension assembly 12 can further include an intermediate seat 56 encircling the shock absorber 20. Said differently, the intermediate seat 56 surrounds the shock absorber 20. At least a portion of the intermediate seat 56 is sandwiched between the first spring 36 and the second spring 42. In certain embodiments, the second end 40 of the first spring 36 abuts the intermediate seat 56 and the second end 46 of the second spring 42 abuts the intermediate seat 56 such that at least the portion of the intermediate seat 56 is disposed between the first spring 36 and the second spring 42. The intermediate seat 56 can include a first side 58 and a second side 60 opposing the first side 58, with the second end 40 of the first spring 36 abutting the first side 58 of the intermediate seat 56 and the second end 46 of the second spring 42 abutting the second side 60 of the intermediate seat 56.

As shown in FIGS. 4 and 5, the actuator 48 is disposed between the intermediate seat 56 and the proximal end 24 of the shock absorber 20 along the central axis 26. The suspension assembly 12 can also include a distal seat 62 disposed proximal to the distal end 22 of the shock absorber 20 and a proximal seat 64 disposed proximal to the proximal end 24 of the shock absorber 20. The first side 58 of the intermediate seat 56 faces the proximal seat 64 and the second side 60 of the intermediate seat 56 faces the distal seat 62. Generally, the first spring 36 abuts the proximal seat 64 and the intermediate seat 56, and the second spring 42 abuts the distal seat 62 and the intermediate seat 56. In certain embodiments, the first end 38 of the first spring 36 abuts the proximal seat 64 and the first end 44 of the second spring 42 abuts the distal seat 62. Specifically, the intermediate seat 56, the first spring 36 and the second spring 42 are disposed between the distal seat 62 and the proximal seat 64, with the intermediate seat 56 spaced from the distal seat 62 and the proximal seat 64. The distal seat 62, the proximal seat 64 and the intermediate seat 56 provide reaction surfaces to counteract the spring force of the first spring 36 and/or the second spring 42.

The intermediate seat 56 is selectively movable relative to the shock absorber 20 in a first direction 66 (see arrow 66 in FIG. 4) and a second direction 68 (see arrow 68 in FIG. 4) opposite the first direction 66 along the central axis 26. As discussed above, the intermediate seat 56 surrounds the cylinder 30, and thus the intermediate seat 56 is movably coupled to the shock absorber 20. Specifically, the intermediate seat 56 is selectively movable relative to the cylinder 30. Therefore, the intermediate seat 56 is not affixed to the shock absorber 20, and thus not affixed to the cylinder 30. Simply stated, the intermediate seat 56 is movable independently of the shock absorber 20.

The movable portion 52 of the actuator 48 is selectively movable to abut the intermediate seat 56. Specifically, as shown in FIG. 4, the movable portion 52 is spaced from the intermediate seat 56 when the movable portion 52 is in the first position which allows the intermediate seat 56 to selectively move in the first direction 66 and the second direction 68 such that both of the first spring 36 and the second spring 42 are compressible. Therefore, when the movable portion 52 is in the first position, both of the first and second springs 36, 42 are compressible which provides a softer vehicle ride due to the first total spring rate being the sum of the first spring rate and the second spring rate.

As shown in FIG. 5, the movable portion 52 abuts the intermediate seat 56 when the movable portion 52 is in the second position which prevents the intermediate seat 56 from being movable in the first direction 66 and prevents the first spring 36 from being compressible such that the second spring 42 is compressible independently of the first spring 36. When the movable portion 52 is in the second position, only the second spring 42 is compressible which provides a stiffer vehicle ride due to the second total spring rate being the second spring rate only. Therefore, the actuator 48 allows the suspension assembly 12 to switch between different spring rates to provide the desired performance of the suspension.

Referring to FIGS. 4 and 5, the movable portion 52 can include a base 70 facing the intermediate seat 56 and selectively abutting the intermediate seat 56. Therefore, the base 70 is spaced from the intermediate seat 56 when in the first position and the base 70 engages the intermediate seat 56 when in the second position. Furthermore, the intermediate seat 56 can include a platform 72 facing the base 70, with the base 70 selectively abutting or engaging the platform 72. Generally, the platform 72 can be disposed along the first side 58 of the intermediate seat 56.

Continuing with FIGS. 4 and 5, the intermediate seat 56 can include a collar 74. The collar 74 encircles or surrounds the shock absorber 20, and more specifically, encircles or surrounds the cylinder 30. The collar 74 can include an inner surface 76 facing the outer surface 54 of the cylinder 30. The inner surface 76 is formed of a self-lubricating material to minimize friction between the intermediate seat 56 and the cylinder 30 during movement of the intermediate seat 56 along the central axis 26. The self-lubricating material can be nylon, Teflon® commercially available from E.I. du Pont de Nemours and Company or any other suitable material to minimize friction between the inner surface 76 and the outer surface 54.

Referring to FIGS. 4 and 5, the stationary portion 50 of the actuator 48 can include a chamber 78. At least a portion of the movable portion 52 is disposed in the chamber 78 when the movable portion 52 is in the first position such that the movable portion 52 is spaced from the intermediate seat 56. In certain embodiments, the chamber 78 is fillable to move the movable portion 52 to the second position such that the movable portion 52 abuts the intermediate seat 56. For example, the chamber 78 can be fillable with a fluid 80 to move the movable portion 52 to the second position. The fluid 80 can be a liquid fluid or a gaseous fluid. In one embodiment, the fluid 80 is hydraulic fluid. In another embodiment, the fluid 80 is air. It is to be appreciated that the fluid 80 can be any suitable fluid. It is to also be appreciated that the actuator 48 can be a hydraulic actuator, an electric actuator or any other suitable actuator to move the movable portion 52 between the first and second positions.

Continuing with FIGS. 4 and 5, the fluid 80 can enter and exit the chamber 78 through one or more tubes 82. A pump 84 can be utilized to move the fluid 80 and the tube(s) 82 can be coupled to the pump 84 to guide the fluid 80 to and from the actuator 48. The pump 84 can be an electric pump or any other suitable pump to move the fluid 80. A reservoir 86 can be coupled to the pump 84 to store the fluid 80 not being utilized by the actuator 48. It is to be appreciated that one or more pumps 84 can be utilized, and one or more reservoirs 86 can be utilized. For example, when more than one suspension assembly 12 is being utilized, more than one pump 84 and/or more than one reservoir 86 can be utilized.

Continuing with FIGS. 4 and 5, the actuator 48 can include one or more seals 88 or gaskets to minimize the fluid 80 from exiting between the stationary portion 50 and the movable portion 52. The chamber 78 can be pressurized and the seal(s) 88 assists in maintaining the pressure in the chamber 78 by minimizing the fluid 80 from exiting between the stationary portion 50 and the movable portion 52. As the fluid 80 enters the chamber 78, the movable portion 52 moves from the first position to the second position. As the fluid 80 exits the chamber 78, the movable portion 52 moves from the second position back to the first position. Since the chamber 78 is pressurized, as the fluid 80 is removed from the chamber 78, back pressure moves or pulls the movable portion 52 back to the first position.

A controller 90 can be in communication with the pump 84 to selectively actuate or operate the pump 84. The controller 90 can be part of an electronic control module that is in communication with various components of the vehicle 10. Generally, the controller 90 signals various components of the vehicle 10 to selectively operate, some of which are discussed below. It is to be appreciated that more than one controller 90 can also be utilized.

The controller 90 can include a processor 92 and a memory 94 on which is recorded instructions for communicating with the pump(s) 84, the actuator(s) 48, etc. The controller 90 is configured to execute the instructions from the memory 94, via the processor 92. For example, the controller 90 can be a host machine or distributed system, e.g., a computer such as a digital computer or microcomputer, acting as a vehicle control module having a processor, and, as the memory 94, tangible, non-transitory computer-readable memory such as read-only memory (ROM) or flash memory. The controller 90 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 90 can include all software, hardware, memory 94, algorithms, connections, sensors, etc., necessary to monitor and control the pump(s) 84, the actuator(s) 48, etc. As such, a control method can be embodied as software or firmware associated with the controller 90. It is to be appreciated that the controller 90 can also include any device capable of analyzing data from various sensors, comparing data, making the necessary decisions required to control and monitor the pump(s) 84, the actuator(s) 48, etc.

Optionally, one or more sensors 96 (see FIGS. 4 and 5) can be coupled to the actuator 48 to monitor the position of the movable portion 52. The sensor(s) 96 can be in communication with the controller 90.

Furthermore, a button, a switch, etc., can be disposed inside a passenger compartment 98 of the vehicle 10 to allow the user to move the movable portion 52 between the first position and the second position. The button can be depressed or switched, etc., depending on whether the user desires a softer suspension or a stiffer suspension. For example, the button can be depressed or switched to move the movable portion from the first position to the second position, and the button can be depressed or switched again to move the movable portion from the second position back to the first position. The button is in communication with the controller 90, and thus the pump 84, to selectively move the movable portion 52. The button can be depressed or switched, etc., when the vehicle 10 is stationary or moving. It is to be appreciated that more than one button, switch, etc., can be utilized.

The suspension assembly 12 described herein provides an active system instead of a passive system. The suspension assembly 12 described herein also provides compact packaging. The suspension assembly 12 can change between spring rates without substantially changing the ground clearance between the road 16 and the vehicle 10, and/or without substantially changing the load carrying capacity of the vehicle 10, and/or without substantially changing the aerodynamic behavior of the vehicle 10. It is to be appreciated that the suspension assembly 12 described herein can also be utilized in conjunction with a ride height adjustment mechanism (i.e., changing the ground clearance) as desired. It is to further be appreciated that the phrase "along the central axis 26" as used herein can include substantially parallel to the central axis 26 or collinearly with the central axis 26.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A suspension assembly for a vehicle; the assembly comprising:
   a shock absorber including a distal end and a proximal end spaced from each other along a central axis;
   wherein the shock absorber includes a cylinder and a piston movably disposed in the cylinder along the central axis;
   a first spring encircling the shock absorber;
   a second spring encircling the shock absorber, with the first spring and the second spring aligning with each other along the central axis between the distal end and the proximal end; and
   an actuator including a movable portion which is movable relative to the shock absorber between a first position wherein the first spring and the second spring are both compressible to define a first total spring rate, and a second position wherein the first spring is incompressible and the second spring is compressible to define a second total spring rate different from the first total spring rate;
   an intermediate seat encircling the shock absorber and at least a portion of the intermediate seat is sandwiched between the first spring and the second spring;
   wherein the intermediate seat includes a collar that surrounds the cylinder of the shock absorber and the collar extends along the central axis such that an inner surface of the collar faces an outer surface of the cylinder; and
   wherein the inner surface is formed of a self-lubricating material to minimize friction between the intermediate seat and the cylinder during movement of the intermediate seat along the central axis.

2. An assembly as set forth in claim 1 wherein the actuator includes a stationary portion affixed to the shock absorber, and the movable portion is coupled to the stationary portion and movable relative to the stationary portion.

3. An assembly as set forth in claim 2 wherein the intermediate seat is selectively movable relative to the shock absorber in a first direction and a second direction opposite the first direction along the central axis, with the movable portion of the actuator selectively movable to abut the intermediate seat.

4. An assembly as set forth in claim 3 wherein the movable portion abuts the intermediate seat when the movable portion is in the second position which prevents the intermediate seat from being movable in the first direction and prevents the first spring from being compressible such that the second spring is compressible independently of the first spring.

5. An assembly as set forth in claim 3 wherein the movable portion is spaced from the intermediate seat when the movable portion is in the first position which allows the intermediate seat to selectively move in the first direction and the second direction such that both of the first spring and the second spring are compressible.

6. An assembly as set forth in claim 3 wherein the stationary portion of the actuator includes a chamber, with at least a portion of the movable portion disposed in the chamber when the movable portion is in the first position such that the movable portion is spaced from the intermediate seat, and with the chamber fillable to move the movable portion to the second position such that the movable portion abuts the intermediate seat.

7. An assembly as set forth in claim 6 wherein the chamber is fillable with a fluid to move the movable portion to the second position.

8. An assembly as set forth in claim 3 wherein the actuator is disposed between the intermediate seat and the proximal end of the shock absorber along the central axis.

9. An assembly as set forth in claim 3 further including a distal seat disposed proximal to the distal end of the shock absorber and a proximal seat disposed proximal to the proximal end of the shock absorber, with the first spring abutting the proximal seat and the intermediate seat, and the second spring abutting the distal seat and the intermediate seat.

10. An assembly as set forth in claim 1 wherein the first spring has a first spring rate and the second spring has a second spring rate, with the second total spring rate equal to the second spring rate.

11. An assembly as set forth in claim 10 wherein the first and second springs are in a series configuration and wherein an inverse of the first total spring rate is the sum of an inverse of the first spring rate of the first spring and an inverse of the second spring rate of the second spring.

12. An assembly as set forth in claim 11 wherein the first spring rate is less than the second spring rate.

13. A vehicle comprising:
a structure;
a suspension assembly coupled to the structure to dampen movement of the structure, the suspension assembly including:
a shock absorber including a distal end and a proximal end spaced from each other along a central axis;
wherein the shock absorber includes a cylinder and a piston movably disposed in the cylinder along the central axis;
a first spring encircling the shock absorber;
a second spring encircling the shock absorber, with the first spring and the second spring aligning with each other along the central axis between the distal end and the proximal end; and
an actuator including a movable portion which is movable relative to the shock absorber between a first position wherein the first spring and the second spring are both compressible to define a first total spring rate, and a second position wherein the first spring is incompressible and the second spring is compressible to define a second total spring rate different from the first total spring rate;
an intermediate seat encircling the shock absorber and at least a portion of the intermediate seat is sandwiched between the first spring and the second spring;
wherein the intermediate seat includes a collar that surrounds the cylinder of the shock absorber and the collar extends along the central axis such that an inner surface of the collar faces an outer surface of the cylinder; and
wherein the inner surface is formed of a self-lubricating material to minimize friction between the intermediate seat and the cylinder during movement of the intermediate seat along the central axis.

14. A vehicle as set forth in claim 13 wherein the actuator includes a stationary portion affixed to the shock absorber, and the movable portion is coupled to the stationary portion and movable relative to the stationary portion.

15. A vehicle as set forth in claim 14 wherein the intermediate seat is selectively movable relative to the shock absorber in a first direction and a second direction opposite the first direction along the central axis, with the movable portion of the actuator selectively movable to abut the intermediate seat.

16. A vehicle as set forth in claim 15 wherein:
the movable portion abuts the intermediate seat when the movable portion is in the second position which prevents the intermediate seat from being movable in the first direction and prevents the first spring from being compressible such that the second spring is compressible independently of the first spring; and
the movable portion is spaced from the intermediate seat when the movable portion is in the first position which allows the intermediate seat to selectively move in the first direction and the second direction such that both of the first spring and the second spring are compressible.

17. A vehicle as set forth in claim 15 wherein the stationary portion of the actuator includes a chamber, with at least a portion of the movable portion disposed in the chamber when the movable portion is in the first position such that the movable portion is spaced from the intermediate seat, and with the chamber fillable to move the movable portion to the second position such that the movable portion abuts the intermediate seat.

18. A vehicle as set forth in claim 13 wherein the first spring has a first spring rate and the second spring has a second spring rate, with the second total spring rate equal to the second spring rate, and wherein the first and second springs are in a series configuration, and wherein an inverse of the first total spring rate is the sum of an inverse of the first spring rate of the first spring and an inverse of the second spring rate of the second spring.

19. A vehicle as set forth in claim 18 wherein the first spring rate is less than the second spring rate.

* * * * *